Patented Jan. 23, 1951

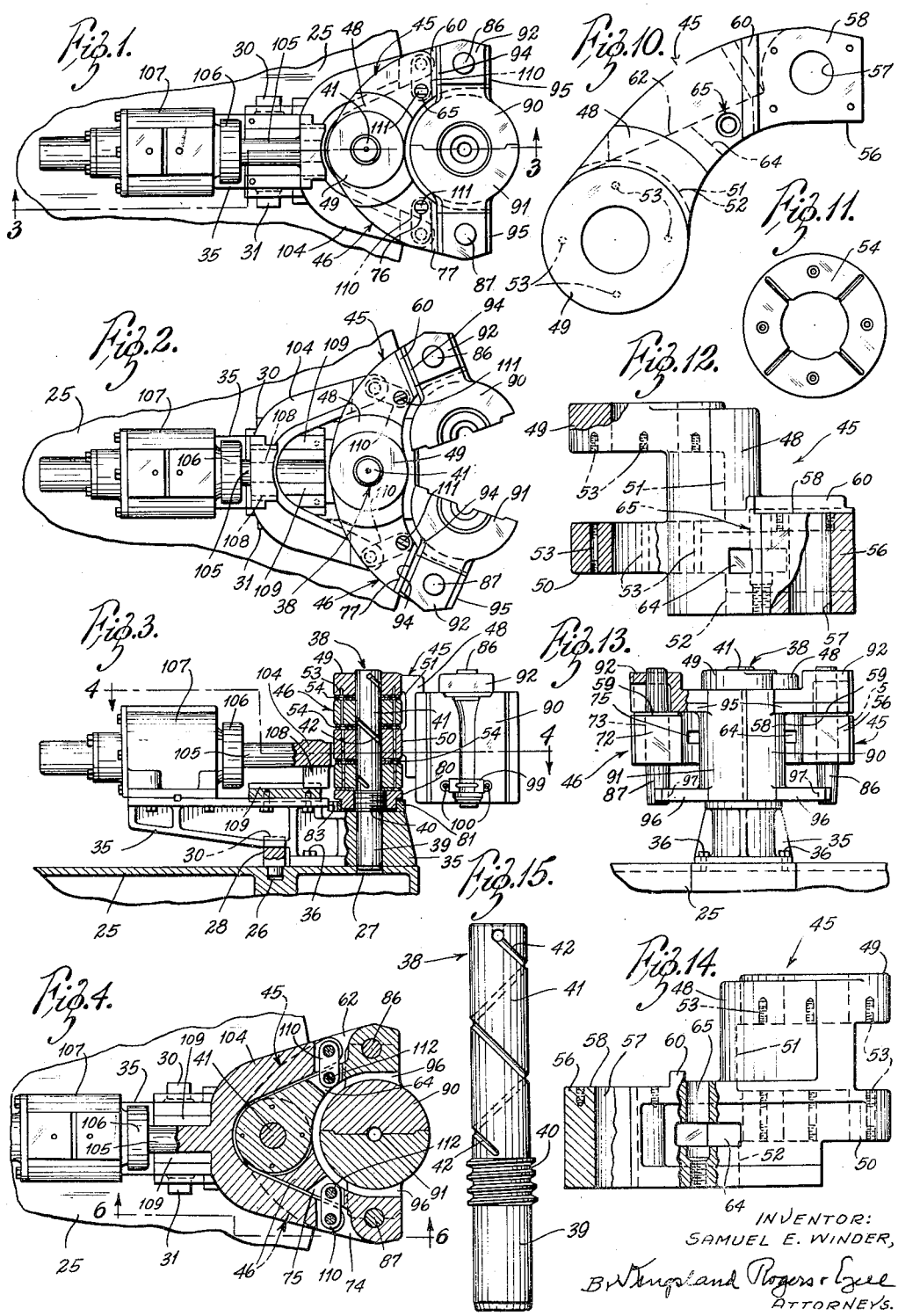

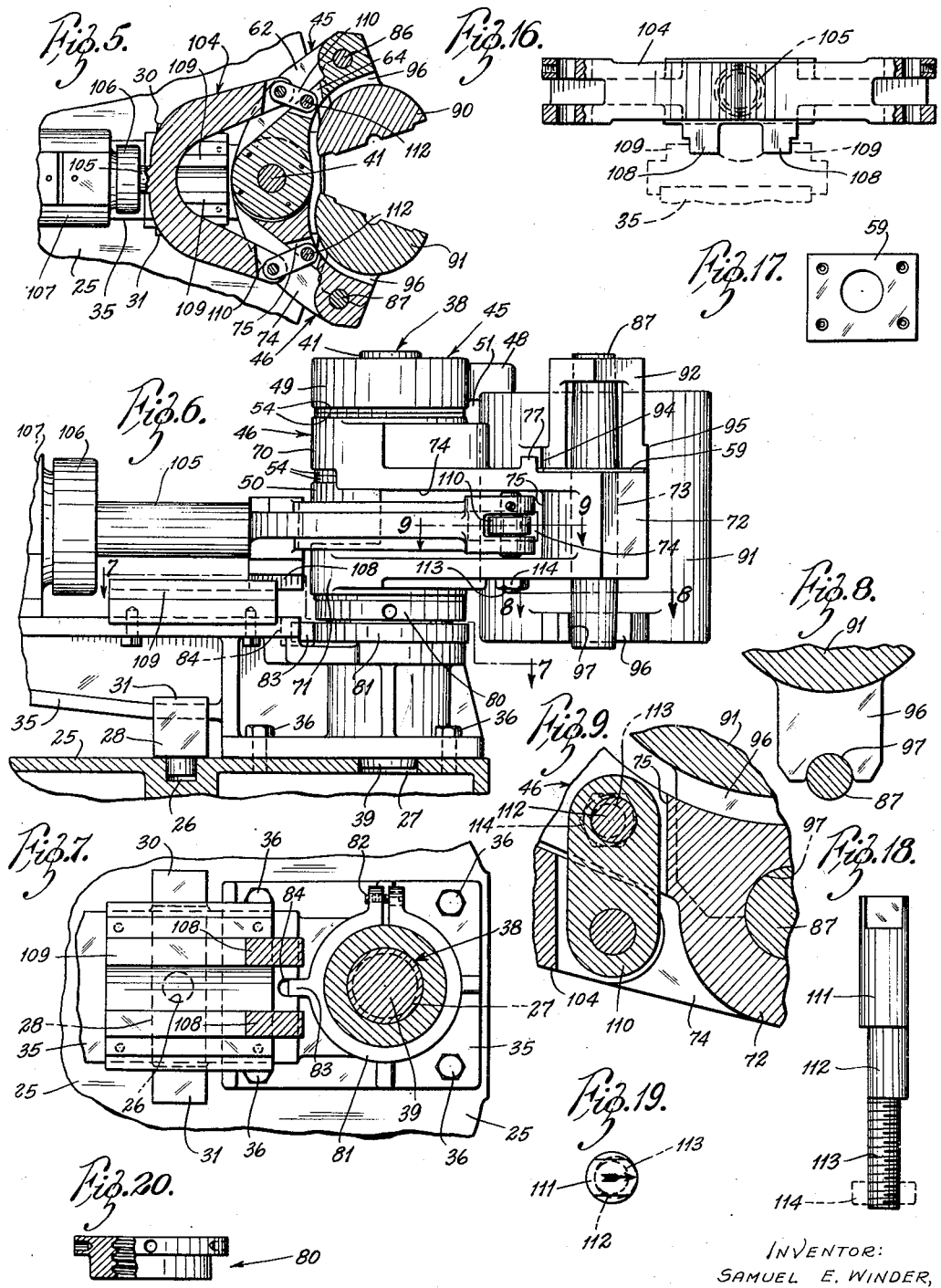

2,538,822

UNITED STATES PATENT OFFICE 2,538,822

GLASS MOLD

Samuel E. Winder, Knox, Pa., assignor of one-half to Henry C. Daubenspeck, Massillon, Ohio Application August 24, 1946, Serial No. 692,749

11 Claims. (Cl. 49—42)

The present invention relates to a glass mold. Particularly, it has to do with a glass mold made in sections and supported for opening and closing movements of the sections.

It is an object of the invention to provide a mold mechanism having mold sections that are supported thereon for ready removal. A particular object is to provide a mold opening and closing means which applies pressure in such a way as to insure full closure of the mold sections together with a minimum of seams on the ultimate ware. To this end, it is an object of the invention to support the mold sections, so as to minimize the effects of warpage of the mold sections under the influence of heat derived from the glass contained within them.

Another object of the invention is to provide a mold mechanism of the foregoing kind wherein the mold sections are removably mounted on mold opening and closing mechanism and are operated so as to minimize the drag on the sections produced during opening and closing movements.

A further object of the invention is to provide novel mold adjusting mechanism for raising and lowering the molds. A further object of the invention is to provide, in the combination previously set out, means for individually adjusting the closing positions of the mold sections.

Other objects will appear from the description to follow.

In the drawings:

Fig. 1 is a plan view of a mold mechanism embodying the present invention, with the mold closed;

Fig. 2 is a plan view of the mold mechanism with the sections open;

Fig. 3 is a longitudinal section through the mechanism, taken approximately on the line 3—3 of Fig. 1;

Fig. 4 is a horizontal partial section taken on the line 4—4 of Fig. 3, showing the mold closed;

Fig. 5 is a similar horizontal section, but showing the mold open;

Fig. 6 is an enlarged side elevation of the mold operating mechanism not showing the air cylinder in full;

Fig. 7 is a horizontal section taken on the line 7—7 slightly below the middle of Fig. 6;

Fig. 8 is a horizontal section taken on the line 8—8 at the right of Fig. 6 and slightly below the middle, this view showing the lower lug arrangement;

Fig. 9 is a horizontal section through the operating links taken on the line 9—9 at the right center of Fig. 6;

Fig. 10 is a plan view of one of the mold hanger arms;

Fig. 11 is a plan view of one of the mold hanger hinge plates;

Fig. 12 is a side elevation of one of the mold hangers, taken from the right of Fig. 10;

Fig. 13 is an end view of the mechanism taken from the right end of Fig. 1;

Fig. 14 is a view partly in section of one of the mold hangers;

Fig. 15 is an elevation of the mold hinge pin;

Fig. 16 is a front or outer view of the yoke partly in section as it would appear from the right in Fig. 1;

Fig. 17 is a plan view of one of the surface plates for the mold hangers;

Fig. 18 is a view of a link adjusting pin arrangement;

Fig. 19 is a plan view of the pin shown in Fig. 18; and

Fig. 20 is an elevation partly in section of a mold adjusting collar.

As shown in Fig. 1 and other views, there is a base 25 which may comprise a mold supporting table that rotates on a suitable machine, such as that shown in copending application, Serial No. 688,470, filed August 5, 1946, of this inventor. This table is provided with a shaped recess 26 and a hole 27 therethrough, these two parts being accurately formed and spaced. A positioning yoke 28 having two upstanding end portions 30 and 31 has a lower projection that fits accurately within the opening 26. These side supports are adapted to engage around the lower, shaped edges of a mold supporting block or bracket 35, which may be positioned, as will appear, on the table 25 and then secured thereto by suitable screws or bolts 36.

The block 35 receives a mold hinge pin, generally designated at 38. This hinge pin has a lower section 39 that is longer than the depth of the bracket 35 in the part through which it passes, so that this portion 39 may engage and accurately fit within the hole 27 in the table 25. This portion 39 of the pin is pressed into an opening extending vertically through the outer part of the bracket 35 until a threaded portion 40, on the pin 38, engages the upper surface of this portion of the bracket. Above the threaded portion, the pin 38 has a hinge portion 41. This is provided with a lubrication groove 42, as shown in Figs. 3 and 15.

The pin 38 is adapted to support two mold hangers, shown particularly in Figs. 10, 12, 13 and 14. The two hangers are generally indicated at 45 and 46. These two hangers are opposites in construction, one being a right-handed hanger and the other being a left-handed one.

The hanger 45 has a vertical central portion 48 from which two hinge ears 49 and 50 project. Between the two hinge ears 49 and 50, the central portion 48 has an arcuate recess 51 to receive a complementary hinge ear on the other hanger. Below the ear 50, the portion 48 is similarly recessed at 52. The lower surface of the hinge ear 49 and the opposite surfaces of the hinge 50 are finished and provided with four holes 53 for the reception of screws that attach mold hinge bearing plates 54 to these several surfaces, as shown in Fig. 3.

The portion 48 has also, projecting in a direction opposite the hinge ears, a hanger end 56. This end has a bore 57 therethrough. It likewise has an upper surface portion 58 that is adapted to receive a plate 59 attached by four screws. Adjacent the inner end of this surface 58, there is a transverse ledge 60 finished on its outer surface.

The center portion 48 has a cut-out portion or recess 62 (Fig. 5) that extends substantially from the area of the hinge ears to the area of the hanger pin support 56. Intersecting this groove or recess 62, there is an angular opening 64 that connects from the recess 62 through to the other side of the arm portion 48. This opening 64 is intersected by an adjusting pin opening, generally indicated at 65, it being reduced in diameter below the recess 64 and the reduced portion being threaded.

The other hanger arm 46 appears in side elevation in Fig. 6 and in outer elevation in Fig. 13.

It is, as already stated, similar to the hanger arm 45, but its hinge ears are disposed so as to interfit with the hinge ears 49 and 50.

This hanger arm 46 has hinge ears 70 and 71 and an outer hanger pin support 72. The support 72 has a pin opening 73. The ears 70 and 71 are similarly formed to receive the bearing plates 54. There is also a recess 74 similar to the recess 62, and an opening 75 similar to the opening 64. The opening 75 is likewise intersected by a pin receiving opening 76 similar to that at 65 in the other hanger arm. There is also a ledge 77 adjacent the inner end of the outer hanger surface. This surface is also formed to receive a bearing plate 59.

It will be seen from the views that the various hinge ears are interfitted and disposed over the hinge pin 38. Below them, and disposed upon the threaded portion 40 of the pin, there is a threaded collar 80 (Figs. 3 and 20) that has a flange provided with openings to receive a spanner wrench. The flange of this collar supports the hinge ears on the hanger arms whereby the mold sections are supported upon the threads 40. It is surrounded by a split ring collar 81 (Fig. 7) that is provided with a screw 82 to attach its ends together and bind it around the collar. It also has an ear 83 that engages in a notch 84 in the bracket or block 35. It is thus prevented from rotation relative to the bracket. When the screw 82 is tightened, the ring binds on the collar 80 and prevents the same from rotating. When the screw 82 is loosened, a wrench may be inserted onto the collar 80 and the same turned to vertically adjust the hinge ears, and consequently the hangers and the mold sections they support. When such adjustment is completed, and proper elevation of the mold is obtained, the screw 82 is again tightened and such adjustment will thereafter be maintained.

Each hanger arm receives a pin. Such pins are designated at 86 and 87. They are pressed into the openings 57 and 73 of the two hanger arms, and project from both the top and the bottom of these arms. These two pins are adapted to receive complementary mold sections, generally indicated at 90 and 91. The two mold sections have the complementary parts of the mold cavity, which is here shown as being for the formation of a parison, although it will be understood that this is not a limitation.

As shown particularly in Fig. 6, each mold section is provided with two pin engaging elements. The upper of these consists of a projection 92. This projection extends upwardly and at its top has a shelf-like portion provided with a hole that engages over the respective pin, which, in Fig. 6, is the pin 87. This section is thereby hinged at its top. The lower part of the projection 92 bears upon the plate 59. It has a lower side edge 94 and an opposite lower side edge 95 that are evenly spaced from the center of the pin openings and that are finished. The one of these lower side edges that is adjacent to one of the upstanding ledges 60 or 77 is engageable against such ledge to afford means to stabilize the mold section on its hanger arm.

At its bottom part, the mold section has a projection or lug 96, which has a half-round recess 97 that engages with the lower end of the pin, which, in Figs. 6 and 8, is the pin 87.

The two mold sections may be hung either way, that is to say, either one on either of the hangers. To dispose the molds thus, they are lifted to fit the upper parts of the projections 92 over the pins and then slipped down over the pins, so that the edges 94 or 95 will come against the proper ledge. In this action, the lugs 96 will engage the pins. It will be seen that the lugs 96 are spaced downwardly sufficiently to permit the vertical, upward movement of the mold sections to remove them from the pins.

Each mold section has a finish ring portion 99 therein. This section is semi-circular and fitted in a corresponding recess in the mold section. The ring section is secured into the mold section by screws 100, and it is provided with slight lost motion so that it may move arcuately therein, as set out in the copending application referred to above. Its outer surface is on a diameter so that it fits flush with the interface of the mold section. The slight looseness permits it to come against its complementary finish ring and close tightly therewith.

The two hanger arms are driven by a yoke member 104. This yoke member is integrally formed with a piston rod 105 that passes through a packing gland 106 into a cylinder 107, which cylinder is mounted on the inner part of the bracket 35. As is known in the art, the piston is reciprocated by air or like means to move the piston rod 105 inwardly and outwardly, carrying the yoke 104 with it. The piston rod has a depending guide element 108 in the form of two prongs that are guided in tracks 109 upstanding oppositely on the bracket 35.

The yoke 104 straddles the hinge ear elements of the hangers 45 and 46. At its outer ends, it has pivoted links 110 that extend into the two recesses 74 and 75 of the hangers. Adjustment pivot pins 111 extend down through the two openings 65 and 76, which pins are supported thereby in the respective hangers and engage the links 110. As shown in Fig. 18, each pin 111 has an upper enlarged section that engages in the upper portion of the openings 65 and 76, an intermediate eccentric section 112, and a lower threaded section 113. The eccentric section 112 passes through the links. The lower section 113 threads into the lower parts of the openings, projects below the hanger arms and receives a lock nut 114.

The yoke reciprocates and thereby projects its arms into the two recesses 62 and 74 of the hanger arms. In so doing, it rocks the links and moves the mold sections apart or pushes them together.

*Operation*

Power for the operation of this mold is obtained from the piston operating within the cylinder 107, which causes reciprocation of the piston rod 105 and the yoke 104. When the mold is open, as shown in Fig. 2, the yoke 104 is drawn backwardly, which motion is transmitted through the links to draw the mold sections on their hinge. When the piston is driven forward, the yoke will be driven outward correspondingly. This force will be transmitted through the links 110 and the pins 111 to the two hanger arms 45 and 46, which are limited to rocking movement on the pin 38. The two mold sections 90 and 91 are thereby moved into their closed position, as shown in Figs. 1 and 4, in which they tightly fit together. In the closed position, it will be seen that the links 110 are in positions that are transverse to the direction of reciprocation of the yoke 104. That is to say, the two pivots on the links 110 are aligned with each in a direction at right angles to the piston rod 105. This arrangement provides for the maximum closing force at the point of closure of the two mold sections.

The two mold sections have only very limited rocking movement on the pins 86 and 87. However, there is sufficient rocking permitted by the ridges 60 and 77 to enable the interfaces of the mold sections to have a tight fit together with substantially equal force throughout. As already noted, this engagement of the two mold sections will automatically align the two finish segments 99.

The closing force applied to the mold sections through the two pins 86 and 87 is applied at the top and at the bottom of the mold sections, since the projection 92 and the lug 96 on each section are connected thereto at the top and at the bottom. The usual expansion tendencies in mold sections are to warp in a manner that curves the top and bottom laterally outwardly from the center part. This comes about because of the application of intense heat to the inner surfaces of the molds, and the consequent greater expansion of the inner surfaces and parts than of the outer parts. This condition is minimized in the present molds because of the application of force in a closing direction at the upper and lower ends of molds, which thereby are restrained against warping outwardly from each other.

When the mold is to be opened, the piston rod 105 is drawn inwardly, carrying the yoke with it. This movement pulls on the links 110 which rock about their two pivots and pull the two hanger arms 45 and 46 in a spreading manner to separate the two mold sections 90 and 91. The mold sections are drawn arcuately apart and are prevented from a twisting movement that may occur in present day molds, which are mounted on straps or yokes in which they have some twisting lost motion directed about the central axis of the mold. Such former mold sections are caused to be twisted because the outer parts must move further than the inner parts owing to their greater distance from the center of rotation in the hinge pins. This condition is aggravated by the resistance applied to the mold sections by the ware and by any surface that they may engage in the process of opening. It will be readily seen that any resistance to opening is more pronounced outwardly from the mold hinge pin 39 than it is inwardly. Hence, such resistance acts with greater effect on the outer parts of the mold halves than it does on the inner parts, and thereby tends to twist the mold halves. As a result of this, the subsequent closing of the molds engages the interfaces at their radially outward parts before it does their inner parts, and there frequently exists a less than tight fit of the interfaces on the inner parts. Such inadequate engagement produces a seam on the ware.

The present arrangement avoids this because the rocking movement, such as it is, takes place about the two pins 86 and 87, and the mold sections are stabilized by the engagement with the ridges 60 and 77. They thereby open cleanly, separating from the ware without displacing it off of its center, and they subsequently re-close in an even manner with a tight engagement of the interfaces throughout. This not only aids in the operation of the machine by avoiding displacement of the ware which is supported on the transfer mechanism or the takeout mechanism when the mold opens, but it also provides better ware by assuring firm and uniform engagement of the interfaces when the mold is closed.

It may be necessary to adjust one mold section relative to the other, so that the molds close on the proper centers. This may be done by turning the pins 111, the heads of which are shaped to receive a wrench. When they are turned, the eccentric portions 112 engaging in the closely fitting holes of the links 110 cause displacement of the associated hanger arms and mold sections.

When it is desired to adjust the molds vertically, this is easily accomplished as aforesaid by loosening the split ring 81 and turning the collar 80 until the mold is at its proper elevation. After this, the ring 81 is again tightened.

When it is desired to change a mold, it is necessary only to open the sections, after which each mold section may be lifted off of its respective pin 86 or 87, as has been described. After this, a different mold section may be disposed on the pin. The other mechanism need not ordinarily be changed, as, even if other mold sections are of different size, their projections 92 and lugs 96 will interfit with the pins as do those shown.

What is claimed is:

1. A glass mold mechanism including a movable mold hanger arm having upper and lower surfaces, the upper surface comprising a mold section bearing surface, a pin projecting above and below said two surfaces, a mold section having an upper projection having an opening adapted to fit over the top of the pin, the projection having a bottom surface engageable on the upper hanger arm surface for support of the section, a lug projecting from the lower part of the mold section and engageable with the adjacent side of the depending pin, said lower lug being spaced below the upper projection to permit the upper lug to be fitted over the top of the pin.

2. A glass mold mechanism including a base, a pin projecting from the base, mold hangers and mold sections pivotally mounted on the pin, means for adjusting the mold hangers and sections axially on the pin, comprising a threaded portion on the pin, a threaded collar on said portion and supporting the hangers, and means to hold the collar immovable.

3. A glass mold mechanism including a base, a pin projecting from the base, mold hangers and mold sections pivotally mounted on the pin, means for adjusting the mold hangers and sections axially on the pin, comprising a threaded portion on the pin, a threaded collar on said portion and supporting the hangers, and means to hold the collar immovable, said last named holding means comprising a ring releasably engageable with the collar and non-rotatably held by the base.

4. In a mold, a mold supporting hanger, a mold section supported transversely thereof with the hanger disposed between the ends of the mold section and adjacent its middle section, a pin extending above and below the hanger, the mold section having supporting lug means at its top extending over the hanger, and the lug means having a supporting surface overlying and resting on the top of the hanger, and having a pin-engaging section spaced upwardly from the supporting surface and adjacent the top of the mold section, and an abutment lug projecting from the bottom of the mold section and engageable with the depending portion of the pin.

5. In a mold, a mold supporting hanger, a mold section supported transversely thereof with the hanger disposed between the ends of the mold section and adjacent its middle section, a pin extending above the hanger, the mold section having supporting lug means at its top extending over the hanger, the lug means having a supporting surface overlying and resting on the top of the hanger, and having a pin-engaging section spaced upwardly from the supporting surface and adjacent the top of the mold section, saddle-like stabilizing lug means projecting from the lower part of the mold section below the hanger, and pin means depending from the hanger and abutting the stabilizing lug means, whereby force from the hanger will be transmitted to the mold section adjacent its top and its bottom from a medially disposed hanger.

6. In a mold, a mold supporting hanger, a mold section supported transversely thereof with the hanger disposed between the ends of the mold section and adjacent its middle section, a pin extending above the hanger, the mold section having supporting lug means at its top extending over the hanger, the lug means having a supporting surface overlying and resting on the top of the hanger, and having a pin-engaging section spaced upwardly from the supporting surface and adjacent the top of the mold section, the pin-engaging section projecting above the top of the mold section.

7. In a mold, a mold section having a lug extending outwardly from the outer surface thereof, a hanger for supporting the section movably, means rockably engaging the lug and the hanger for attaching the mold section to the hanger for movement therewith comprising a pin through the hanger and the lug, the lug overlying the hanger, a wall of substantial area on the hanger adjacent the lug, and a surface of substantial area on the lug and of shape complementary to the wall, lying alongside and in close proximity to the wall when the section is attached to the hanger, the wall and the surface being adapted to limit the rocking movement of the mold section on the hanger in both angular directions.

8. In a mold, a pair of complementary mold sections, a pair of movable mold hangers, each mold section having a lug extending outwardly from the back side of the section, interengaging means rockably attaching each lug to one hanger, each lug having lateral surfaces trued with respect to the interengaging means, on opposite sides of the lug, and an interfitting means on the hanger engageable by said lateral surfaces to limit the rocking movement of the mold sections on their respective hangers, said interengaging means for the mold sections and hangers being interchangeable so that the mold sections may be interchanged on the hangers, the lateral surfaces on the opposite sides of the lugs providing limiting means engageable with the interfitting means on the hanger regardless of which mold section is on which hanger.

9. A glass mold comprising a pair of pivotally connected mold hangers, complementary mold sections, one on each hanger, a yoke reciprocable with respect to the hangers, link means between each yoke arm and one hanger, for causing reciprocation of the yoke to pivot the hangers and to open and close the mold sections, the link means being pivoted at their ends to the yoke and the hangers, means to adjust at least one pivot of one link means to displace it toward and from the other pivot of its link means, to regulate the position of its corresponding mold section relative to the other mold section, in the direction of travel of the sections, the adjusting means including an eccentric portion on said pivot, whereby upon rotation of the pin the adjustment aforesaid may be made, and means to hold the pin in adjusted position.

10. A mold including a base, a pin upstanding from the base, a plurality of mold hangers rockably mounted on the pin, and urged toward the base, a collar on the pin interposed between the mold hangers and the base, the collar being rotatable on the pin, means to change the elevation of the hangers on the pin by rotation of the collar, and means to hold the collar in its rotated position.

11. In a mold assembly, a mold hanger, a mold section, and means for removably attaching the mold section to the hanger; the attaching means including a first portion and a second portion interengageable with the first portion, one portion being on the hanger and the other on the mold section; the first portion including a first projection having vertical pin-like means extending above and below it, the second portion including a pair of spaced projections having a space between them greater than the vertical dimensions of the first projection plus the length of the pin-like means in one of its directions, one of said second and third projections having a hole to receive the pin-like means, and the other of said two projections having an abutment surface to engage the side of the pin-like means to apply force from the hanger to the section through the pin-like means and the projections.

SAMUEL E. WINDER.

REFERENCES CITED

The following references are of record in the file of this patent:

UNITED STATES PATENTS

| Number | Name | Date |
|---|---|---|
| 1,856,577 | McLaughlin | May 3, 1932 |
| 1,974,841 | Allen | Sept. 25, 1934 |
| 2,018,785 | Harrison | Oct. 29, 1935 |
| 2,161,255 | Howard | June 6, 1939 |
| 2,307,563 | Bridges | Jan. 5, 1943 |
| 2,378,176 | Bert | June 12, 1945 |